United States Patent [19]
Dahn et al.

[11] Patent Number: 5,449,577
[45] Date of Patent: Sep. 12, 1995

[54] METHOD FOR INCREASING THE REVERSIBLE CAPACITY OF LITHIUM TRANSITION METAL OXIDE CATHODES

[75] Inventors: Jeffrey R. Dahn, Surrey; Eric W. Fuller, Coquitlam; Monique N. Richard, Grand Sault, all of Canada

[73] Assignee: Moli Energy (1990) Limited, Canada

[21] Appl. No.: 369,726

[22] Filed: Jan. 6, 1995

[30] Foreign Application Priority Data

Jan. 28, 1994 [CA] Canada ................................ 2114493

[51] Int. Cl.$^6$ ..................... H01M 10/40; C01D 15/00
[52] U.S. Cl. .................................... 429/94; 429/218; 423/594; 423/599
[58] Field of Search ............... 429/194, 197, 218, 224; 423/593, 594, 641, 599; 252/182.1

[56] References Cited

U.S. PATENT DOCUMENTS

| | | |
|---|---|---|
| 4,246,253 | 1/1981 | Hunter . |
| 4,302,518 | 11/1981 | Goodenough et al. . |
| 4,567,031 | 1/1986 | Riley ........................... 423/593 |
| 4,770,960 | 9/1988 | Nagaura et al. ............. 429/218 X |
| 5,211,933 | 5/1993 | Barboux et al. . |
| 5,264,201 | 11/1993 | Dahn et al. .................. 423/594 |

OTHER PUBLICATIONS

M. M. Thackeray, et al., "Spinel Electrodes from the Li–Mn–O System for Rechargeable Lithium Battery Applications", J. Electrochem. Soc., vol. 139, No. 2, Feb. 1992, pp. 363–366.

T. Ohzuxu, et al., "LiMnO2 as Cathode for Secondary Lithium Cell", Chemistry Express vol. 7, No. 3, pp. 193–196 (1992) (not available–Month).

A. Momchilov, et al., "Rechargeable lithium battery with spinel-related MnO2 II. Optimization of the LiMn2O4 synthesis conditions", Journal of Power Sources, 41, (1993) pp. 305–314 (Month not available).

Primary Examiner—Anthony Skapars
Attorney, Agent, or Firm—Lerner, David, Littenberg, Krumholz & Mentlik

[57] ABSTRACT

A method is disclosed for increasing the reversible capacity of lithium transition metal oxide materials for use as cathodes in non-aqueous lithium batteries. The method involves reduction of oxide materials of the form $Li_xM_yO_z$, wherein M represents transition metals whereby oxygen is removed while still maintaining the original phase of the material. Use of the method of the invention is particularly useful for oxide materials synthesized at low temperatures and where M is Mn.

46 Claims, 10 Drawing Sheets

METHOD FOR INCREASING THE REVERSIBLE CAPACITY OF LITHIUM TRANSITION METAL OXIDE CATHODES

FIELD OF THE INVENTION

The invention relates to the field of batteries. In particular, it relates to materials for use as cathode electrodes in lithium batteries.

BACKGROUND OF THE INVENTION

Non-aqueous lithium batteries have long been known to offer certain advantages over the more conventional aqueous systems. These advantages generally include higher operating voltages per cell, superior shelf-life and charge retention, and higher gravimetric and volumetric energy densities. Primary lithium batteries have been available commercially for many years in various sizes for many consumer electronics applications. Secondary or rechargeable batteries are also commercially available, but until recently these have been limited to small sizes (e.g. coin cell size). Larger rechargeable lithium batteries have historically proven not to be safe enough for consumer applications.

A larger type of rechargeable battery, known as a lithium-ion or rocking chair battery, has recently become a state-of-the-art power source for consumer electronics devices. Two companies, Sony Energy Tec and A&T Battery, presently manufacture lithium-ion batteries employing a lithium cobalt oxide compound as the cathode and a carbonaceous material as the anode. These batteries have significantly greater energy density than either conventional Ni-Cd or Ni-Metal Hydride (Ni-MH) batteries. Furthermore, since the lithium-ion batteries have an average discharge voltage of about 3.6 volts, a single Li-ion battery can be used to replace three series connected Ni-Cd or Ni-MH batteries.

Preferred materials for use as cathodes in both primary and secondary lithium batteries include members of the class consisting of transition metal oxides or lithiated transition metal oxides. Vanadium oxide and manganese oxide cathode materials are particularly common. Lithiated transition metal oxides are at present the preferred cathode material for use in Li-ion batteries. Unlike other Li batteries where Li is usually incorporated into the anode on assembly (often directly as Li metal or in the form of a Li alloy), in a conventional Li-ion battery the lithium transition metal oxide cathode is the only source of lithium available for battery operation. Thus, for optimum battery capacity, it is desirable to use a lithiated transition metal oxide cathode containing substantial amounts of lithium that can be extracted and re-inserted reversibly. Additionally, it is desirable that the lithiated cathode material be completely stable in air for manufacturing simplicity. Examples of suitable cathode materials include both $LiCoO_2$ and $LiNiO_2$ (described in U.S. Pat. No. 4,302,518) and $LiMn_2O_4$, (described in U.S. Pat. No. 4,246,253). Currently, only Li-ion batteries employing Co based cathodes are available. Since Co is relatively rare and is hence expensive, competitive, less expensive alternatives are desirable. Ni based cathodes can be less expensive but both Co and Ni compounds are considered potential cancer causing agents. Being relatively inexpensive and less of a health concern, Mn based compounds appear to be attractive potential alternative cathode materials.

For these reasons, lithium manganese oxides have been extensively studied for use as cathode materials for rechargeable lithium batteries. These oxides typically can have stoichiometries wherein the Li:Mn ratio ranges from 0 to 2, and the O:Mn ratio ranges from 2 to 3. In a rechargeable battery, the capacity is a function of how much lithium can be reversibly inserted into the host oxide cathode. For some lithium-manganese oxides, almost all the available lithium can be reversibly inserted.

The spinel materials $Li_4Mn_2O_4$ (described in M. M. Thackeray et al, J. Electrochem. Soc. 137, 769 (1990)) and the aforementioned $LiMn_2O_4$ both contain at least ½ mole of Li per mole of manganese and are hence attractive materials for use in Li-ion batteries. If all the lithium in these compounds could be removed and re-inserted reversibly, these materials would have reversible capacities of 148 and 216 mAh/g respectively. Recently, as in T. Ohzuku et al, Chemistry Express 7, 193 (1992), a low temperature form of orthorhombic $LiMnO_2$, called LT-$LiMnO_2$, has also been found to be an attractive electrode material. Again, if all the lithium in LT-$LiMnO_2$ could be removed and re-inserted reversibly, it would have a reversible capacity of 285 mAh/g.

However, not all the lithium in these Li-Mn-O compounds can always be removed electrochemically. In fact, A. Momchilov et al, J. Power Sources 41, 305 (1993) show that the reversible capacity of $LiMn_2O_4$ depends critically on synthesis conditions, with the best materials being made between 650° C. and 750° C. Momchilov et al. also show that the surface area of the material synthesized decreases with increasing synthesis temperature. Higher surface area materials are attractive however for high discharge rate capability in batteries. Thus, it would appear that both reversible capacity and surface area cannot be optimized independently during this synthesis. Low temperature synthesis can produce the highest surface areas, but high temperature synthesis results in the highest reversible capacity.

The effect of higher synthesis temperature on reversible capacity was also noted in U.S. Pat. No. 5,211,933 where the capacity for the invention $LiMn_2O_4$ made @300° C. increases from about 75 mAh/g to about 120 mAh/g for conventional material made @800° C. However, the desirable advantages of the method of the invention are achieved at temperatures below 600° C.

The desirable material LT-$LiMnO_2$ is made at temperatures below 350° C. Higher temperature treatment even in an inert atmosphere results in a conversion of this material to crystalline $LiMnO_2$ with poor electrochemical behaviour. The reversible capacity of the LT-$LiMnO_2$ material reported in the aforementioned paper by T. Ohzuku et al. was about 190 mAh/g.

As is clear from the preceding, certain advantages can be realized by synthesizing Li-Mn-O compounds at low temperature. However, the resulting material can have less than optimal reversible capacity. Ideally, obtaining the certain advantages in combination with optimum reversible capacity is preferred.

Standard methods exist for the controlled removal of oxygen from solid oxide compounds. A preferred method in the art is to heat such a compound in a reducing gas mixture wherein a gas such as $H_2$, $NH_3$ or the like is used to react with oxygen in the compound thereby forming gaseous reaction products which can be easily removed. Such a method is described in U.S.

Pat. No. 5,240,794 to prepare desirable Li-Mn-O cathode precursors for use in lithium batteries. Said method can be used to augment the total amount of lithium loaded into a Li-ion battery. However a change in phase or phases of the Li-Mn-O compounds is often involved both in the method reduction step and in subsequent use in a battery wherein the invention precursor is delithiated irreversibly to act as a cathode after a first activating recharge.

SUMMARY OF THE INVENTION

The inventors have discovered a method for improving the reversible capacity of lithium transition metal oxide cathode materials. The controlled removal of oxygen from these materials, while maintaining the same phase, can result in enhanced reversible capacity. Thus, the reversible capacity of a conventionally prepared starting material, denoted as $Li_xM_yO_{z'}$, wherein M is one or more transition metals and x, y, and z' are numbers greater than zero, can be enhanced, where the material properties allow it, by treating said material in a reducing environment. The resulting cathode material, denoted $Li_xM_yO_z$ wherein z is a number greater than zero, would be in the same phase as said starting material with $z<z'$.

In addition to $Li_xMn_yO_z$ cathodes, it is expected that similar capacity benefits might be realized, where properties of the materials allow, for Li-M-O cathode materials based on all transition metals. The method of the invention can be particularly useful when applied to starting materials synthesized at temperatures below about 500° C. An additional useful feature of the method of the invention can be that the surface area of the material is not appreciably affected by the reduction treatment.

The reduction treatment can be accomplished by various conventional means. However, a preferred method comprises heating the starting material in a reducing gas mixture comprising a gas selected from the group of $NH_3$, $H_2$, CO, organic gases, and the like. Said heating can be performed at temperatures below about 300° C. Specific $Li_xMn_yO_z$ cathode materials can be prepared wherein the reversible capacity of the conventional starting material used can be increased by use of the method of the invention. These specific cathode materials include:

i) A compound in the phase of spinel $LiMn_2O_4$ with x about 1, y about 2, and z about 4 wherein the starting material used is that of the prior art low temperature spinel $Li_xMn_yO_{z'}$, where z' can be about 4.5 or less. The reduction method can involve treating this starting material in a gas mixture comprising $NH_3$ below about 250° C. for up to two hours.

This specific compound can have both the desirable relatively high reversible capacity of the prior art high temperature spinel compound in combination with the relatively high surface area of the prior art low temperature spinel compound.

ii) A compound in the phase of $Li_4Mn_5O_{12}$ with x about 4, y about 5, and z about 12 wherein the starting material used is that of $Li_xMn_yO_{z'}$, prepared at low temperature where z' is about 12. The reduction method can involve treating this starting material in a gas mixture comprising $NH_3$ below about 225° C. for up to 2 hours.

iii) A compound in the phase of $LT-LiMnO_2$ with x about 1, y about 1, and z about 2 wherein the starting material used is that of the prior art LT-LiMnO₂. The reduction method can involve treating this starting material in a gas mixture comprising $NH_3$ below about 225° C. for up to 2 hours.

Non-aqueous batteries comprising an anode, an electrolyte and a cathode can therefore be fabricated wherein the cathode comprises material prepared using the method of the invention. The anodes for such batteries can be any appropriate material for use in lithium batteries including lithium itself, lithium alloys and carbonaceous or other lithium insertion compounds. The electrolyte for lithium non-aqueous batteries comprises a lithium salt dissolved in a mixture of non-aqueous solvents. A salt can be $LiPF_6$ and a suitable solvent mixture includes dimethyl carbonate (DMC), ethylene carbonate (EC) and propylene carbonate (PC).

BRIEF DESCRIPTION OF THE DRAWINGS

The following drawings are presented to illustrate certain aspects of the invention but should not be construed as limiting in any way:

FIG. 4b shows an expanded view of some of the data in FIG. 4a.

DETAILED DESCRIPTION OF SPECIFIC EMBODIMENTS OF THE INVENTION

The method of the invention involves treating a suitable starting material in a reducing environment such that oxygen is removed without changing the phase of said starting material. It is possible however that starting materials can be chosen whose properties do not allow oxygen to be removed without resulting in a phase change of some kind. Often, starting materials synthesized at relatively high temperatures, ie. above 500° C., cannot have significant oxygen removed while still maintaining the same phase. The reversible capacity of such materials therefore cannot be enhanced by the method of the invention. On the other hand, many known starting materials for potential use as cathodes in lithium batteries can have oxygen removed while still maintaining the same phase. Often, these starting materials are synthesized at relatively low temperatures, ie. below 500° C., while still maintaining the same phase. The reversible capacity of these materials can be increased by use of the method of the invention.

Herein, a change in phase is defined as involving a change in the symmetry of the crystalline structure of the compound in question. Small changes in the magnitudes of the lattice parameters do not in themselves constitute a change in phase if symmetry is maintained.

Any common reduction method can be employed including treatment with a reducing agent in a gaseous or liquid environment. Preferably, the starting material is heated appropriately and exposed to a gas flow comprising a reducing agent such as $NH_3$ gas. Gaseous by-products are removed as the reaction proceeds by the existing gas flow.

Typically the suitable starting material is prepared in powder form initially (usually of order of 10 microns in size) and is thus physically ready to be used in the fabrication of battery cathodes. The powdered starting material is then placed in a suitable container having inlet and outlet gas flow means. The container can be part of a furnace or be placed in a furnace so that the contents can be heated. The reduction treatment itself then simply involves exposing the heated starting material to an appropriate reducing gas flow for a certain period of time. Ideally, the maximum amount of oxygen is removed while still maintaining the same phase. After treatment, the invention cathode material can now be further processed in a conventional way, with the exception that further heat treatment in air at elevated temperatures must be avoided to prevent re-oxidation of the cathode material.

There is some significant scope available in the choice of gases used, concentrations thereof, and flow rate used in order to achieve the desired results. $NH_3$ is a relatively safe gas that can be used as a reducing agent and can be used at full concentration at a low arbitrary flow rate. Other treatment parameters including temperature and exposure time can be determined empirically. However, a preferred method for this determination is illustrated in the examples to follow and involves testing sample material using a thermogravimetric analyzer (TGA) to observe the weight loss versus temperature characteristics of the starting material under given gas conditions. TGA results coupled with x-ray diffraction analysis of the tested sample material as a function of temperature provide a good estimate for choice of optimum treatment temperature.

Loss of oxygen is inferred by weight loss (which can also include adsorbed $H_2O$ and/or other volatiles to some extent). X-ray diffraction analysis can be used in order to verify that the phase of the starting material is maintained. Finally, the increase in reversible capacity must be determined in trial battery cycling tests.

An alternate but similar method to the preceding might involve mixing a suitable powdered starting material with an appropriate amount of a solid reducing agent (such as carbon powder), followed by heat treatment. As a result of this treatment, the solid reducing agent may be consumed by reacting with oxygen from the starting material thereby generating gaseous reaction products which can be similarly carried away in an inert gas flow.

A variety of battery embodiments are possible using cathode material prepared by the method of the invention. Miniature laboratory batteries employing a lithium metal anode are described in the examples to follow. A preferred construction for a lithium ion type system is that depicted for a commercially available spiral-wound type battery in the cross-sectional view of FIG. 1. A jelly roll 4 is created by spirally winding a cathode foil (not shown), an anode foil (not shown), and two microporous polyolefin sheets (not shown) that act as separators.

Cathode foils are prepared by applying a mixture of a lithium transition metal oxide material treated using the method of the invention, possibly other powdered cathode material if desired, a binder, and a conductive diluant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that powdered carbonaceous material (either partially graphitized carbon or graphite) is used instead of the cathode material and thin copper foil is usually used instead of aluminum. Anode foils are typically slightly wider than the cathode foils in order to ensure that anode foil is always opposite cathode foil. This feature is illustrated with the cathode upper edge 13, cathode lower edge 14, anode upper edge 12, and anode lower edge 15 depicted in FIG. 1.

Figure 1:
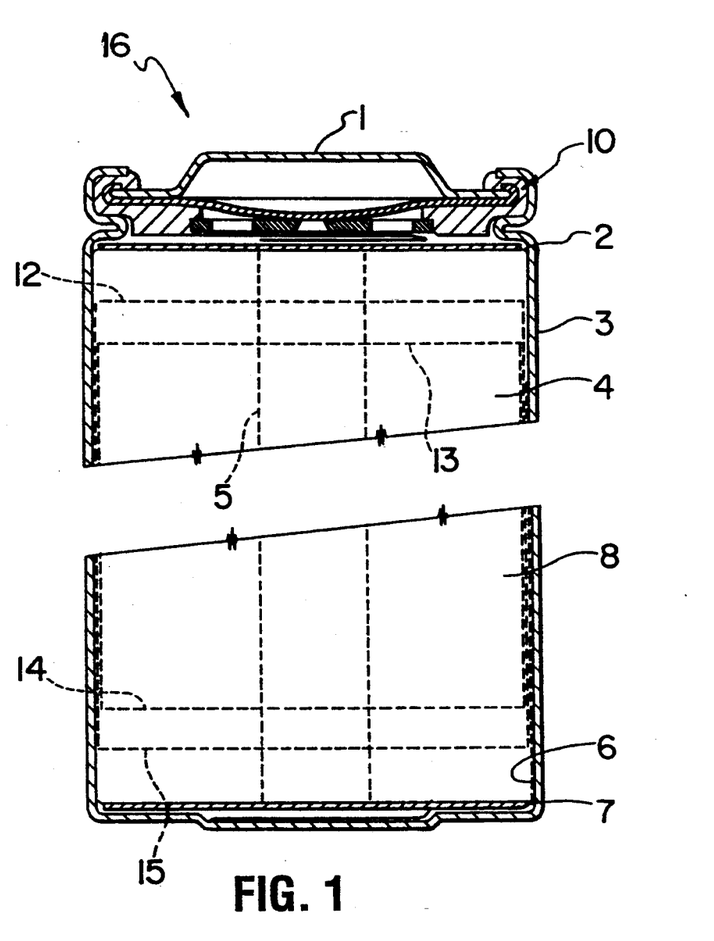
FIG. 1 shows a cross-sectional view of a preferred construction for a spiral-wound lithium ion type battery.

The jelly roll 4 is inserted into a conventional battery can 3. A header 1 and gasket 10 are used to seal the battery 16. The header may include safety devices if desired. A combination safety vent and pressure operated disconnect device may be employed. FIG. 1 shows one such combination that is described in detail in Canadian Patent Application No. 2,099,657. Additionally, a positive thermal coefficient device (PTC) may be incorporated into the header to limit the short circuit current capability of the battery. The external surface of the header 1 is used as the positive terminal, while the external surface of the can 3 serves as the negative terminal.

Appropriate cathode tab 5 and anode tab 6 connections are made to connect the internal electrodes to the external terminals. Appropriate insulating pieces 2 and 7 may be inserted to prevent the possibility of internal shorting. Prior to crimping the header 1 to the can 3 in order to seal the battery, electrolyte 8 is added to fill the porous spaces in the jelly roll 4.

Those skilled in the art will understand that the types of and amounts of the component materials must be chosen based on component material properties and the desired performance and safety requirements. Use of the method of the invention is expected to provide additional flexibility in this choice, in that the method allows certain properties to be varied independently. Generally an electrical conditioning step, involving at least the first recharge of the battery, is part of the assembly process. Again, the determination of an appropriate conditioning step along with the setting of the battery operating parameters (e.g. voltage, current, and temperature limits) would be required of someone familiar with the field.

Other configurations or components are possible for the batteries of the invention. For example, a prismatic format is considered highly desirable and possible. Also, Li metal or Li alloys may be used as the anode material. A miniature version of a Li metal anode based embodiment is described in the laboratory coin cell examples to follow.

Examples are given to show how the reversible capacity of certain specific Li-Mn-O cathode materials can be increased and also to illustrate principles of the method of the invention. However, these examples should not be construed as limiting in any way. The preparation of the starting materials is described in each specific case. Where applicable, the reduction process was performed by treating bulk samples of powdered Li-Mn-O compounds with pure anhydrous $NH_3$ in tube furnaces equipped with stainless steel furnace tubes. The ends of the furnace tubes were closed by flanges having gas flow fittings thus providing inlet and outlet flow means. $NH_3$ gas was passed over the heated sample at about a rate of 60 cc/min and typically proceeded for times of order of two hours at the indicated temperature.

Where indicated, a TA Instruments Model 951 TGA was used to study the reduction of the various Li-Mn-O compounds under pure anhydrous $NH_3$ as a function of temperature. After the TGA experiments, the remaining solid products were generally studied using x-ray diffraction to identify the solid phases present.

A Philips powder diffractometer equipped with a Cu target x-ray tube and a diffracted beam monochrometer was used for the x-ray diffraction measurements. Hill and Howard's version (J. Appl. Crystallography, 18,173 (1985)) of the Rietveld (J. Appl. Crystallography, 2, 65 (1969)) powder profile refinement software was used to quantitatively analyze the x-ray data.

Figure 2:
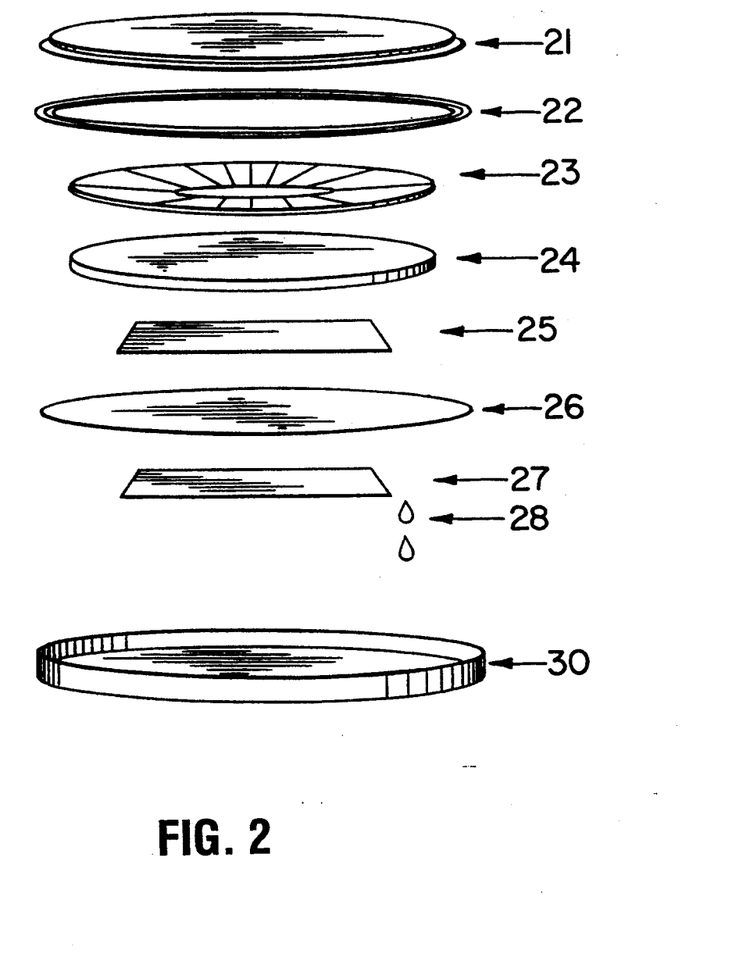
FIG. 2 shows an exploded view of the laboratory coin cell battery used in the Examples.

Laboratory coin cell batteries were used to determine electrochemical characteristics. These were assembled using conventional 2325 hardware and with assembly taking place in an argon filled glove box as described in J. R. Dahn et al, Electrochimica Acta, 38, 1179 (1993). FIG. 2 shows an exploded view of the coin cell type battery. A stainless steel cap 21 and special oxidation resistant case 30 comprise the container and also serve as negative and positive terminals respectively. A gasket 22 is used as a seal and also serves to separate the two terminals. Mechanical pressure is applied to the stack comprising lithium anode 25, separator 26, and cathode 27 by means of mild steel disc spring 23 and stainless disc 24. The disc spring was selected such that a pressure of about 15 bar was applied following closure of the battery. 125 μm thick metal foil was used as the lithium anode 25. Celgard ® 2502 microporous polypropylene film was used as the separator 26. The electrolyte 28 was a solution of 1M $LiPF_6$ salt dissolved in a solvent mixture of DMC, PC, and EC in a volume ratio of 50/25/25 respectively.

Cathodes 27 were made by uniformly coating a 20 μm thick aluminum foil substrate with a blend containing Li-Mn-O powder, Super S carbon black conductive dilutant, and ethylene propylene diene monomer (EPDM) binder in amounts of 88%, 10%, and 2% by weight respectively. A slurry containing cyclohexane solvent was made initially wherein appropriate amounts of the Li-Mn-O powder and carbon black were added to a binder solution containing 4% EPDM in cyclohexane. Excess cyclohexane was then added until the slurry viscosity was like that of a syrup, whereupon the slurry was then coated onto the foil using a doctor blade spreader. Cyclohexane was then evaporated away at room temperature in air. Electrodes were never heated to avoid re-oxidizing those materials that had been previously reduced. After drying, the electrode was compacted between flat plates at about 25 bar pressure. A cathode 27 of dimension 1.2 cm × 1.2 cm was then cut from this larger electrode using a precision cutting jig. The cathode 27 was then weighed and the active Li-Mn-O mass present was obtained by subtracting the weight of Al foil, EPDM and carbon black present.

Coin cell batteries were thermostatted at 30°±1° C. before testing and were then charged and discharged using constant current cyclers with ±1% current stability. Data was logged whenever the cell voltage changed by more than 0.005 V.

ILLUSTRATIVE EXAMPLE 1

The spinel compound denoted $LiMn_2O_4$ was prepared by mixing and reacting stoichiometric amounts of $MnO_2$ (Chemical Manganese dioxide—Chemetals, Baltimore Md., U.S.A.) and $Li_2CO_3$ (FMC Corp., Bessemer City, N.C., U.S.A.) at 750° C. in air for 24 hours. The sample was then ground and reheated at 750° C. for another 24 hours. This preparation method is similar to that described in the aforementioned reference of Momchilov et al. The product is hereinafter denoted $LiMn_2O_4$-750 to designate the synthesis temperature. The lattice constant of this material was 8.246 Å, in good agreement with the value of the aforementioned reference of Thackeray et al. The surface area of the product was found to be 2.5 $m^2/g$ as determined by BET analysis.

Figure 3:
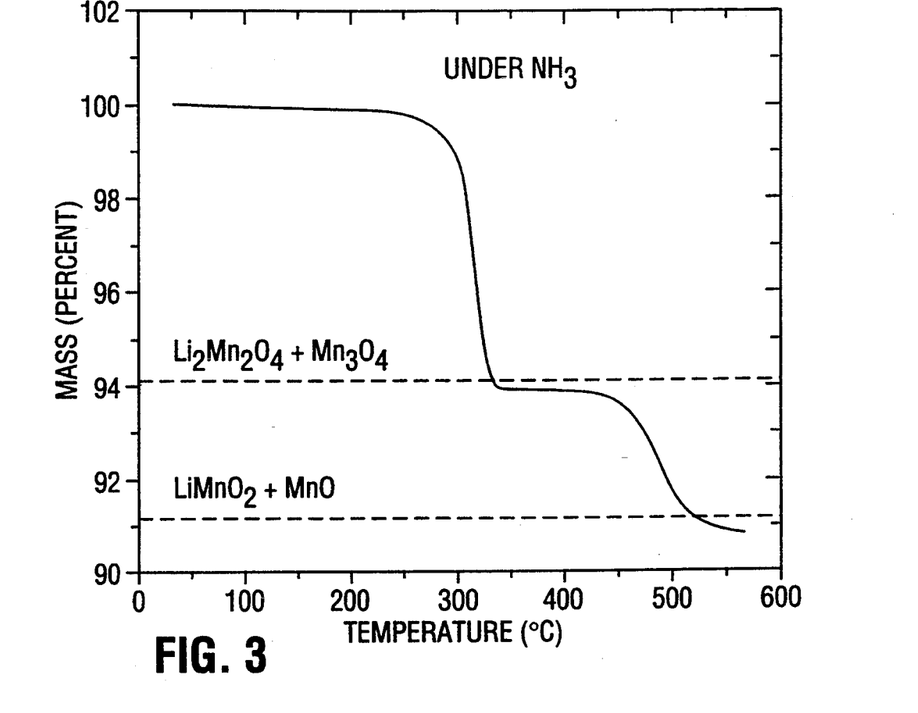
FIG. 3 shows the TGA weight loss versus temperature curve for the starting material of Illustrative Example 1.

TGA analysis was performed on this sample where the temperature was ramped at 1° C./minute under pure $NH_3$ gas. FIG. 3 shows the weight loss versus temperature curve for this experiment. Around 250° C., the sample begins to lose appreciable mass, presumably as it is reduced to form $Li_2Mn_2O_4$, $Mn_3O_4$, and reaction gases. Samples of $LiMn_2O_4$-750 heated to 350° C. in the TGA under $NH_3$ and afterwards examined by x-ray diffraction show only $Li_2Mn_2O_4$ and $Mn_3O_4$. Such decomposition of $LiMn_2O_4$, assuming it goes to completion via this reaction (ie. every 2 moles of $LiMn_2O_4$ are reduced to give 1 mole of $Li_2Mn_2O_4$ and $\frac{2}{3}$ mole of $Mn_3O_4$), would result in a calculated remaining mass as shown by the upper dashed line in FIG. 3. This calculated mass agrees well with the observed mass plateau in the vicinity.

Figure 4A:
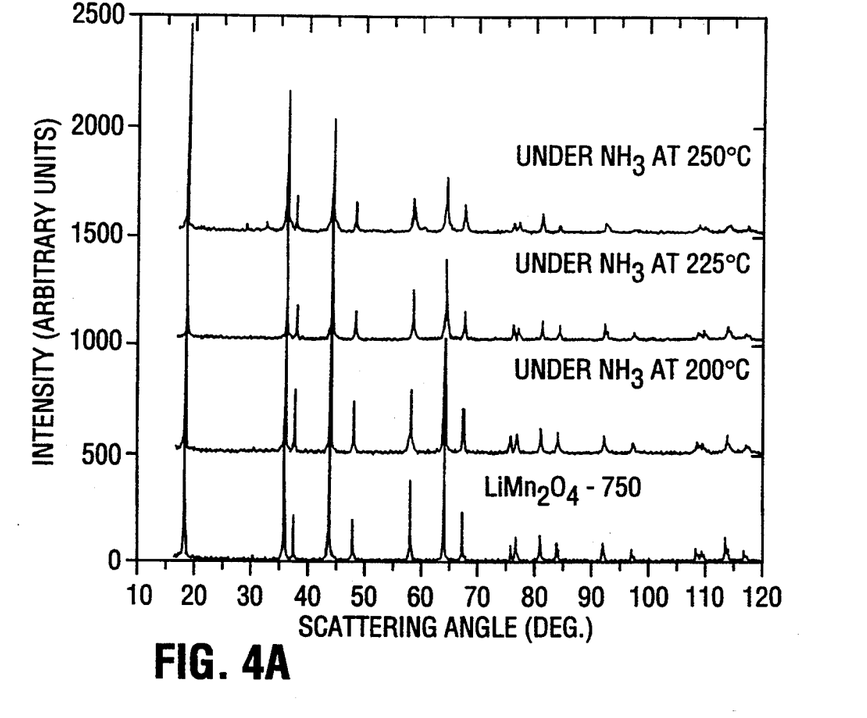
FIGS. 4a and 4b show the x-ray diffraction patterns for the starting material and the reduced samples of Illustrative Example 1.
Figure 5:
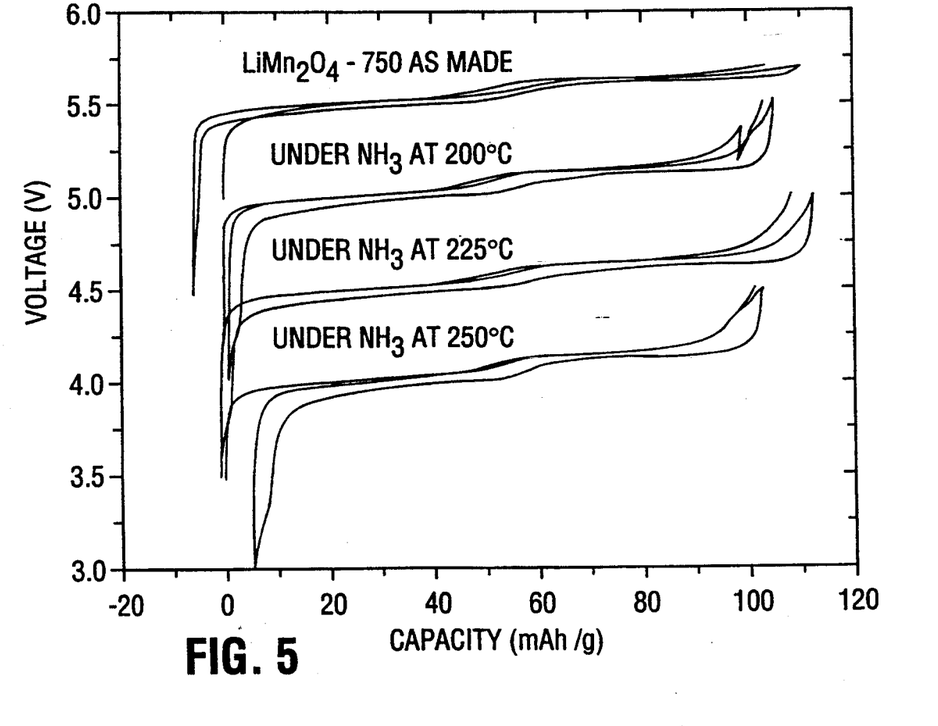
FIG. 5 shows the voltage versus capacity characteristics for the coin cell batteries of Illustrative Example 1.

Upon further heating, a second region of weight loss is observed beginning near 400° C. This corresponds to the formation of orthorhombic $LiMnO_2$ and $MnO$, as confirmed by x-ray diffraction of the product of the TGA scan to 570° C. shown in FIG. 3. The calculated remaining mass, assuming that decomposition of $LiMn_2O_4$ to orthorhombic $LiMnO_2$ and $MnO$ goes to completion, is indicated by the lower dashed line in this Figure. Three different samples of $LiMn_2O_4$-750 were next subjected to reduction treatment in the furnace as described earlier under pure ammonia at temperatures of 200°, 225°, and 250° C. respectively. X-ray diffraction patterns for these samples plus that of the starting material itself are shown in FIG. 4a. A series of laboratory coin cell batteries were assembled using cathodes from the starting material and from the samples reduced at 200° C., 225° C., and 250° C. under ammonia. The voltage versus capacity curves for these coin cell batteries are shown in FIG. 5. (For clarity, the voltage curves have been offset sequentially by 0.5 V in this Figure.)

Figure 4B:
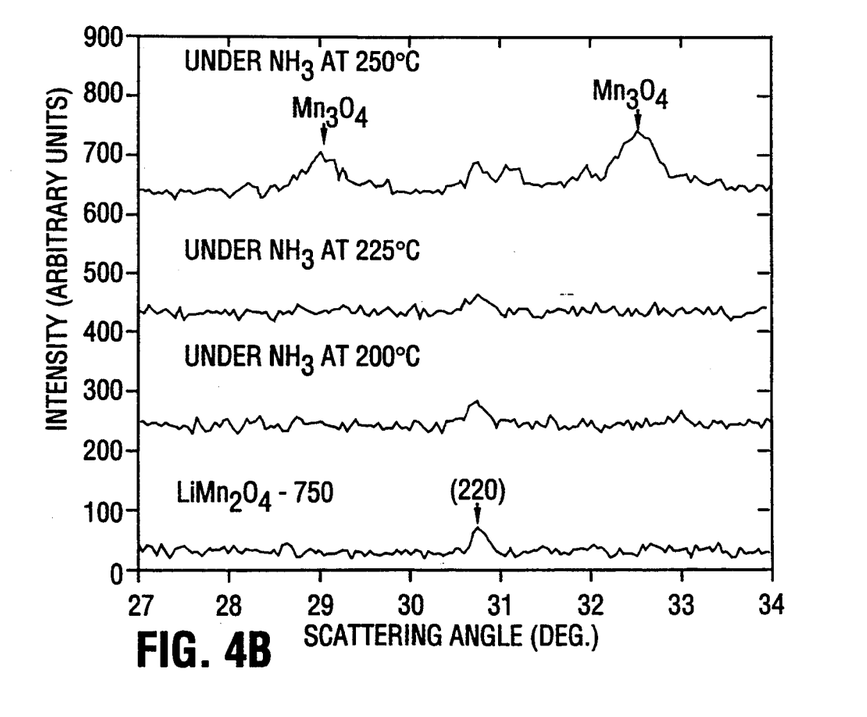

The TGA scan in FIG. 3 shows almost no mass loss up to 250° C. FIG. 4a shows that no changes in the x-ray diffraction pattern from that of the starting material are evident until 250° C. (FIG. 4b shows an expanded view of some of the data in FIG. 4a that clearly shows the appearance of $Mn_3O_4$ in the sample heated to 250° C. Rietveld profile analysis done on the starting material and on the samples treated at 200° C. and 225° C. showed identical structural parameters within error). The electrochemical results shown in FIG. 5 show little difference in behaviour between samples. All had reversible capacities of about 100 between 3.5 V and 4.25 V. Based on these results, it appears to be difficult to remove oxygen from $LiMn_2O_4$-750 by ammonia treatment without changing the phase of the material. The effect of the ammonia reduction treatment below 225° C. has a negligible effect on the electrochemical characteristics of the starting material.

This example illustrates that not all starting materials can benefit from the method of the invention.

INVENTIVE EXAMPLE 1

The low temperature spinel compound otherwise similar to that of illustrative Example 1, was prepared by reacting stoichiometric ratios of $LiNO_3$ (Aldrich Chemical Co.) and $\gamma$-MnOOH (Chemetals) at 400° C in air. The product material hereinafter is referred to as $LiMn_2O_4$-400. The lattice constant of this material was 8.168 Å and had a surface area of 10.1 m$^2$/g as determined by BET. The lower lattice constant of $LiMn_2O_4$-400 compared to that of $LiMn_2O_4$-700 is likely caused by the higher oxygen content in the former material which in turn results in a greater ratio of $Mn^{4+}$ to $Mn^{3+}$ cations in the former. Since $Mn^{4+}$ cations are smaller than $Mn^{3+}$ (R. D. Shannon, Acta Cryst., A32, 51 (1976)), $LiMn_2O_4$-400 would be expected to have a smaller lattice size.

Figure 6:
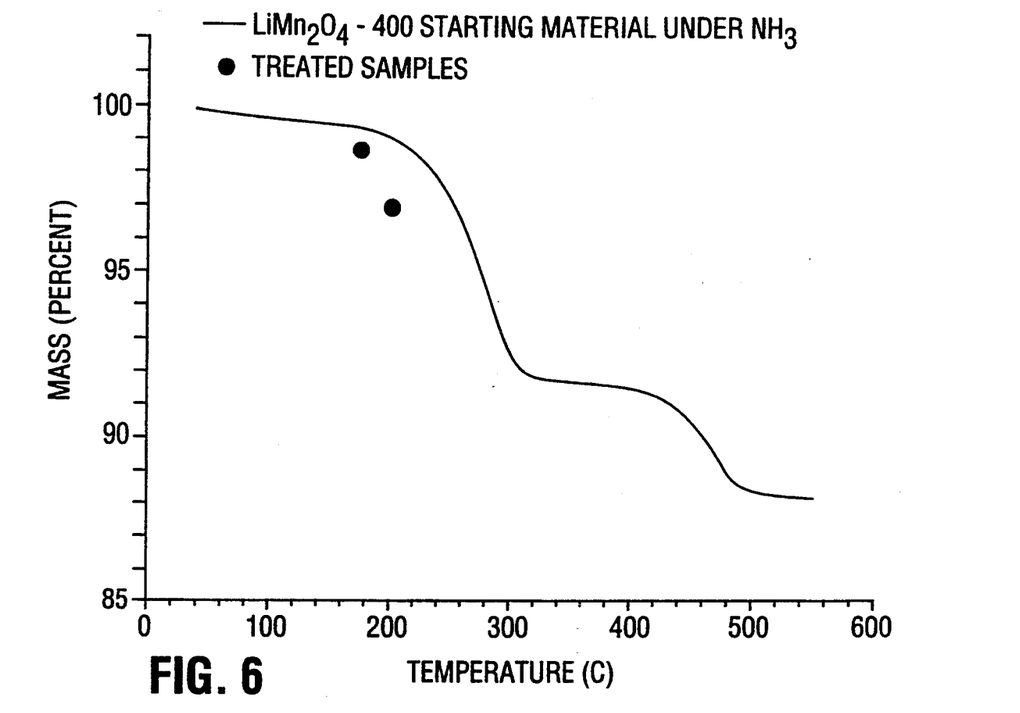
FIG. 6 shows the TGA weight loss versus temperature curve for the starting material as well as the weight loss data points for the reduced samples of Inventive Example 1.

A TGA test was performed on this $LiMn_2O_4$-400 sample under $NH_3$ at a heating rate of 1° C./minute. FIG. 6 shows the relative weight versus temperature curve. In contrast to the data in FIG. 3, there is a gradual mass loss below about 200° C. This suggests that excess oxygen may be being removed below 200° C. (Thackeray et al, in their aforementioned reference, claim that $LiMn_2O_{4.5}$ can be made at 400° C. If the example $LiMn_2O_4$-400 actually had this stoichiometry, a 4% mass loss would result if extra oxygen were removed to make stoichiometric $LiMn_2O_4$.)

Two bulk samples of $LiMn_2O_4$-400 were treated under ammonia as described previously. The first sample, A, was treated at 200° C. while the second sample, B, was treated at 175° C. (Above 200° C., the weight loss is rapid and drops to the plateau observed near the 90% of the original mass level. This reaction corresponds to the formation of $Li_2Mn_2O_4$ and $Mn_3O_4$). After treatment, the masses of samples A and B were 97% and 98.7% of original respectively. Data points indicating these levels are shown for each sample in FIG. 6. The surface area of sample A was determined by BET to be 13.9 m$^2$/g.

Figure 7:
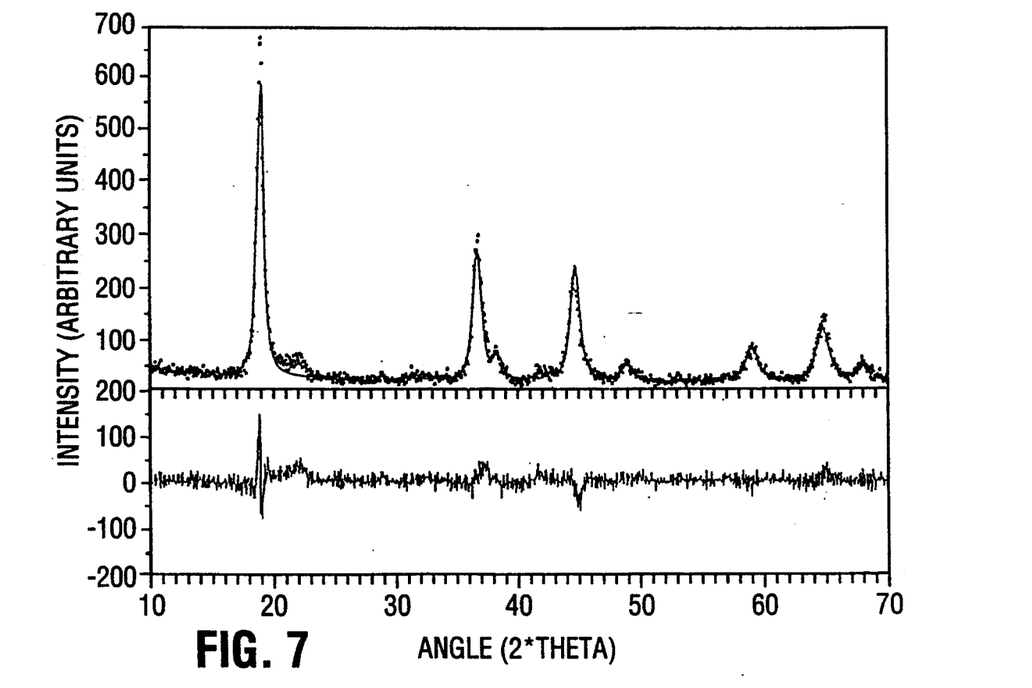
FIG. 7 shows the x-ray diffraction patterns for the starting material of Inventive Example 1.
Figure 8:
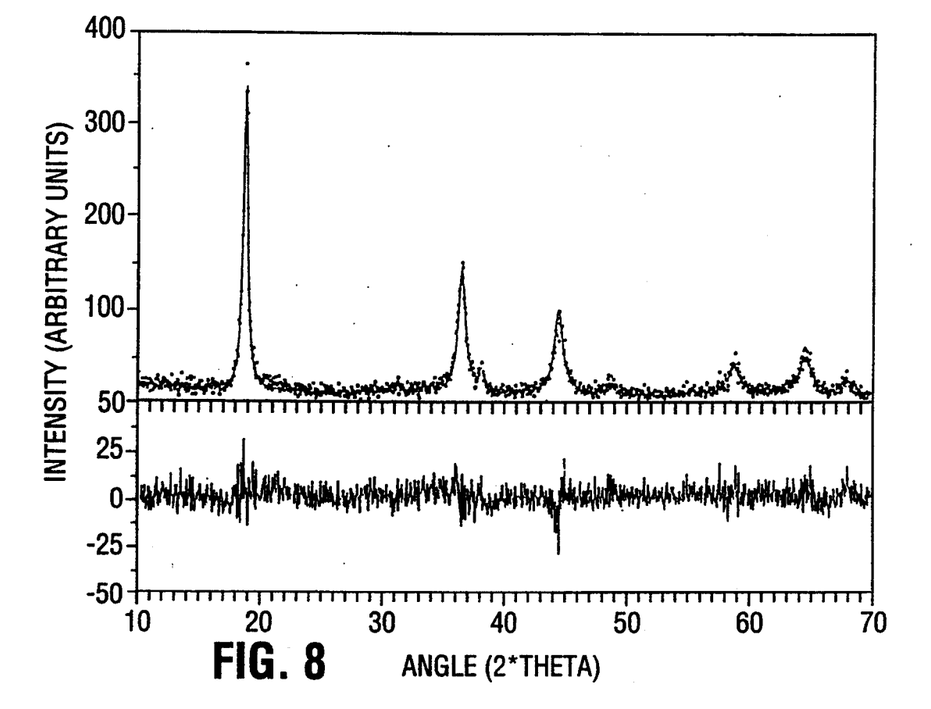
FIG. 8 shows the x-ray diffraction patterns for one of the reduced samples of Inventive Example 1.

Rietveld profile analysis was used to study the $LiMn_2O_4$-400 starting material and treated sample A. The same refining strategies were used in each case. FIG. 7 shows the measured x-ray profile, the calculated profile, and the difference between the two for $LiMn_2O_4$-400. FIG. 8 shows the measured x-ray profile, the calculated profile and the difference between the two for sample A. (The good agreement between measured and calculated profiles shown in FIGS. 7 and 8 is indicative of a reliable refinement.) The lattice constants of $LiMn_2O_4$-400, sample B, and sample A were determined to be 8.168 Å, 8.194 Å, and 8.210 Å respectively. This lattice constant shift is consistent with the reduction of $Mn^{4+}$ to $Mn^{3+}$ as O is removed during the reduction treatment.

Figure 9:
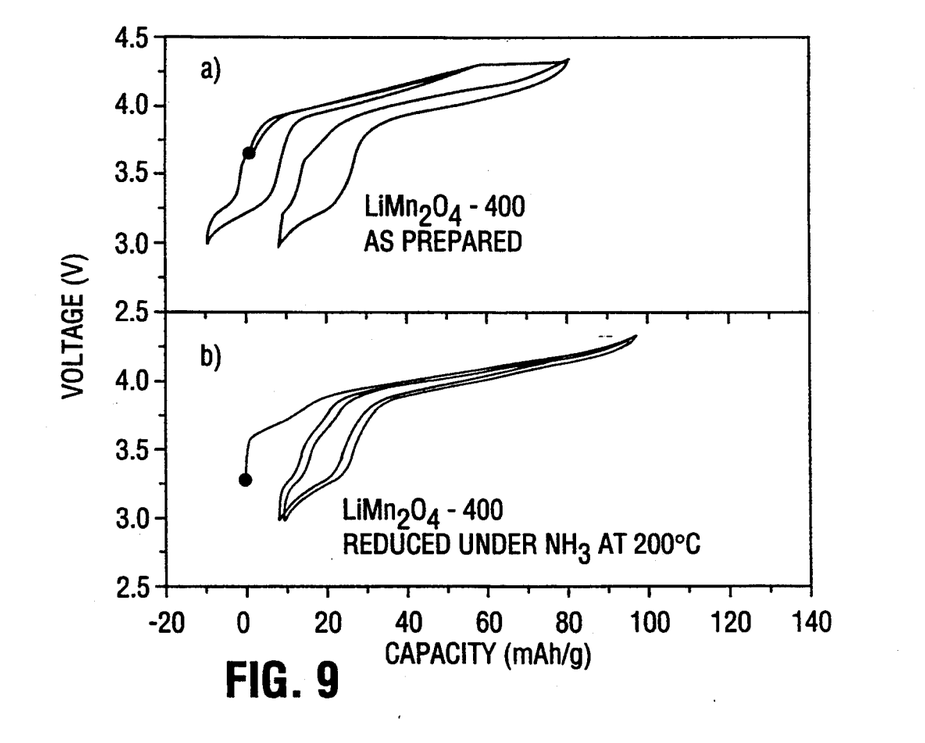
FIG. 9 shows the voltage versus capacity characteristics for coin cell batteries of Inventive Example 1.

Two laboratory coin cell batteries were constructed and cycled using cathodes from each bulk batch of $LiMn_2O_4$-400 and sample B respectively. All batteries were charged to 4.2 V initially and were cycled afterwards between 3.0 V and 4.35 V. The currents used corresponded to 3.0 mA/gram of active cathode material. FIG. 9 shows the voltage versus capacity curves for these coin cell batteries. The sample B battery has substantially more capacity than that of the $LiMn_2O_4$-400 battery.

During the first charge to 4.35 V, the $LiMn_2O_4$-400 battery shows an extra voltage plateau near 4.3 V that is not seen in subsequent cycles. This plateau is observed in all such batteries made to date, provided that the charging current is small (of order of 3 mA/g). When the charging current is increased to 15 mA/g, this extra plateau is eliminated. It is speculated that the extra plateau may be associated with release of some of the excess oxygen in the material. This release may be kinetically slow and therefore may be observed when the batteries are charged slowly. Oxygen release would probably be detrimental to the electrolyte of the battery. Use of the method of the invention may be used to avoid such an occurrence also.

Figure 10:
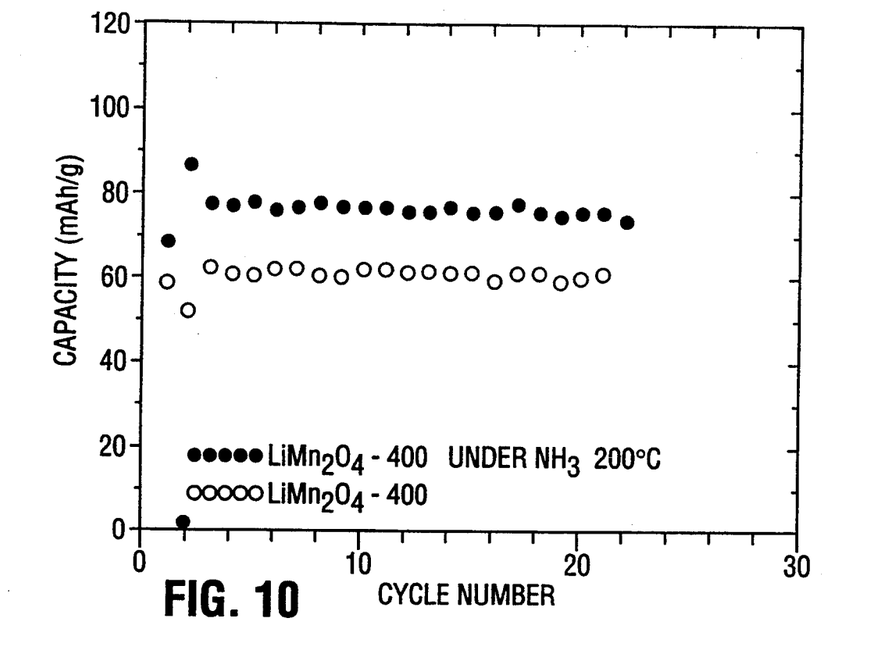
FIG. 10 shows the discharge capacity versus cycle number curves for coin cell batteries of Inventive Example 1.

Another two batteries were constructed and cycled as in the preceding except that the currents used were 30 mA/g for discharge and 15 mA/g for recharge. FIG. 10 shows the discharge capacity versus cycle number for each battery. Again, the sample B battery had substantially more capacity than that of the $LiMn_2O_4$-400 battery.

This example confirms that a low temperature synthesis method can result in higher surface area for the product $LiMn_2O_4$ powder (compare to Illustrative Example 1) and that use of the method of the invention not only enhances the reversible capacity, but can also maintain a higher surface area for the product powder.

INVENTIVE EXAMPLE 2

A low temperature spinel compound similar to $Li_4Mn_5O_{12}$ in the aforementioned reference of Thackeray et al was prepared by reacting stoichiometric ratios of $Li_2CO_3$ and $MnCO_3$ at 400° C. as described in said reference. Several intermediate grindings and heatings were performed to increase the sample purity. Hereinafter the product will be denoted $Li_4Mn_5O_{12}$-400. The lattice constant of this product was 8.134 Å in good agreement with said reference. The smaller lattice constant of $Li_4Mn_5O_{12}$-400 as compared to that of $LiMn_2O_4$-400 (Inventive Example 1) is presumably mainly due to the fact that all the manganese in the former exists as $Mn^{4+}$.

Figure 11:
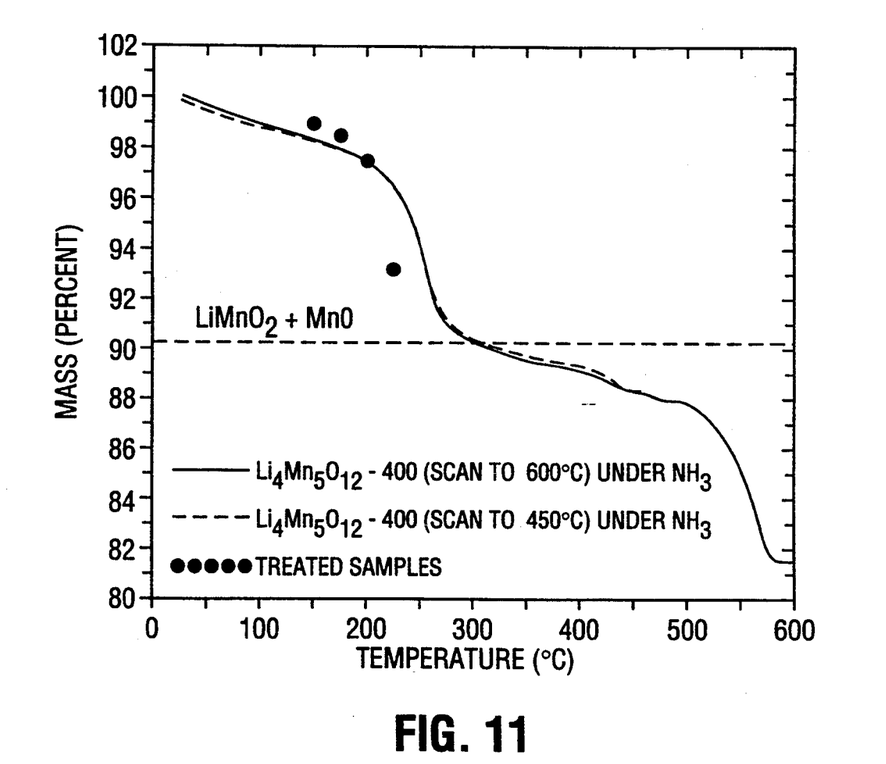
FIG. 11 shows the TGA weight loss versus temperature curve for the starting material as well as the weight loss data points for the reduced samples of Inventive Example 2.

Two TGA scans on this Li$_4$Mn$_5$O$_{12}$-400 material were performed under NH$_3$ at a heating rate of 1° C./min. FIG. 11 shows the relative weight versus temperature curves for these scans. One scan proceeded to a 450° C. endpoint (dashed line) while the other proceeded to 600° C. (solid line).

Four bulk Li$_4$Mn$_5$O$_{12}$-400 samples were processed using the method of the invention as described earlier under ammonia at temperatures of 150°, 175°, 200°, and 225° C. respectively. Hereinafter these samples will be referred to as C, D, E, and F respectively. The relative mass losses for these treated bulk samples are indicated by the points on FIG. 11. The observed mass losses for the bulk samples are in good agreement with the TGA scans of this Figure, with the exception of sample F. Sample F apparently underwent the reaction corresponding to the large mass loss seen in the TGA scans near 225° C. (The TGA scans provide weight loss data as the temperature is ramped relatively quickly. Thus, TGA results may not always match the results obtained for long exposure times at fixed temperature.)

The sample used in the TGA scan ending at 450° C. was analyzed by x-ray diffraction and was found to be predominantly LiMnO$_2$ and MnO. (The sample used in the TGA scan ramped up to 600° C. was unsuitable for analysis. The mass loss which begins above 500° C. involves a reaction of the samples with the Al pan used in the TGA apparatus to hold the sample). The gradual mass loss below 200° C. in FIG. 11 suggests that an oxygen deficient material Li$_4$Mn$_5$O$_z$ wherein $z<12$ can be prepared.

Figure 12:
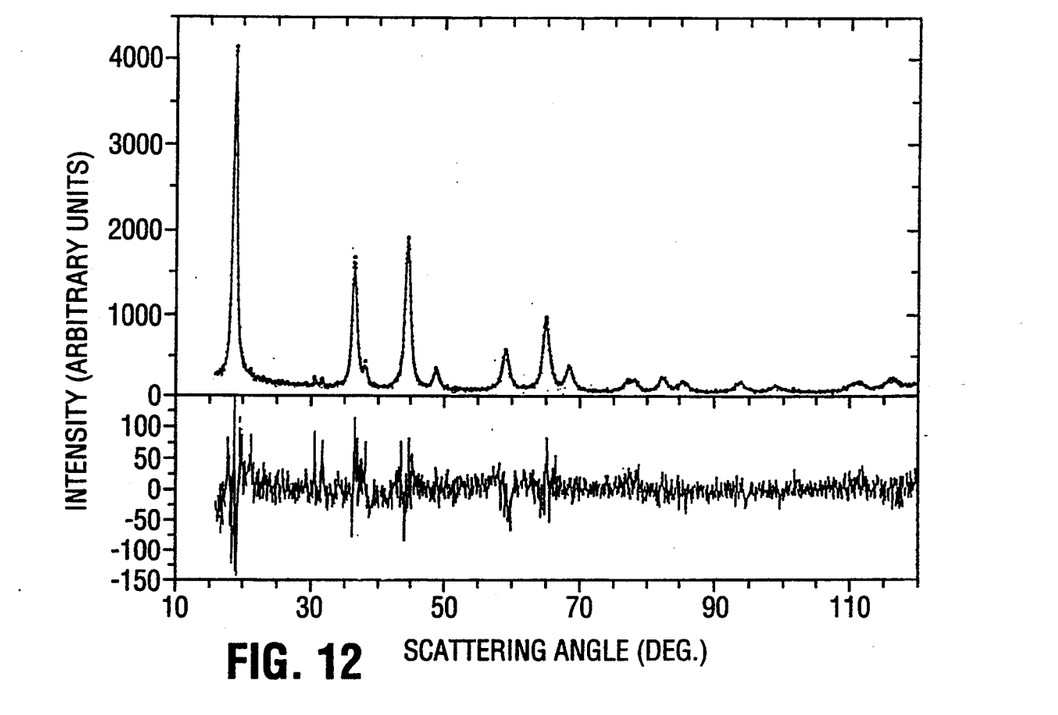
FIG. 12 shows the x-ray diffraction patterns for the starting material of Inventive Example 2.
Figure 13:
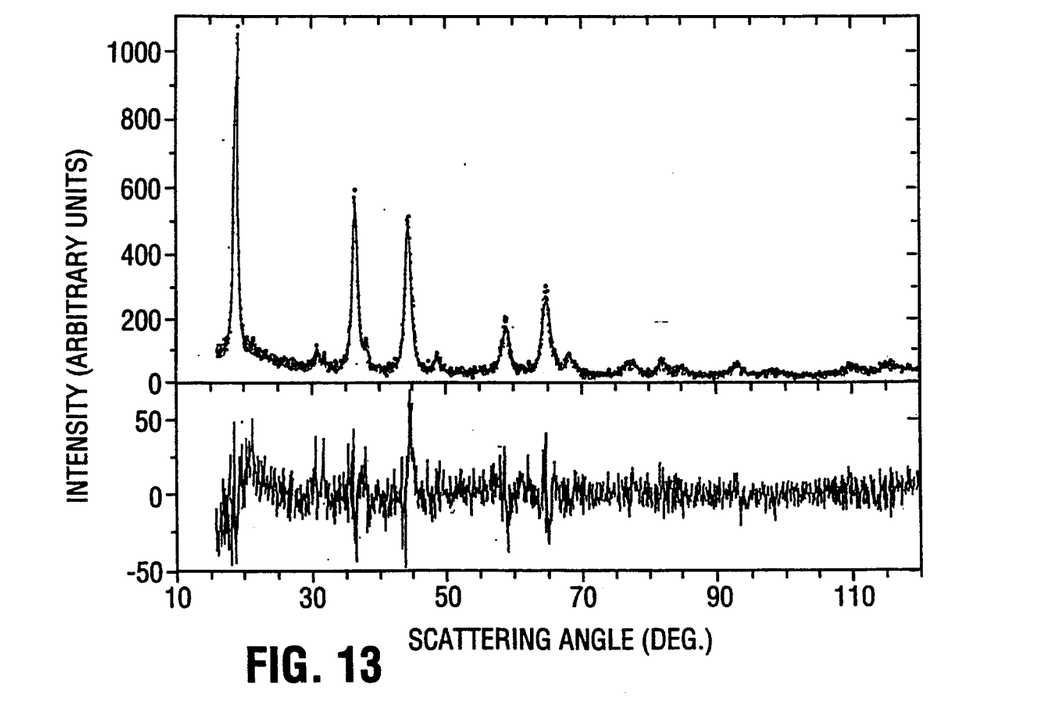
FIG. 13 shows the x-ray diffraction patterns for one of the reduced samples of Inventive Example 2.

Rietveld profile analysis was used to study the Li$_4$Mn$_5$O$_{12}$-400 starting material and the treated samples C, D, and E. The same refining strategies were used in each case. FIG. 12 shows the measured x-ray profile, the calculated profile, and the difference between the two for Li$_4$Mn$_5$O$_{12}$-400. FIG. 13 shows the measured x-ray profile, the calculated profile and the difference between the two for sample E. The good agreement between measured and calculated profiles shown in FIGS. 12 and 13 is indicative of a reliable refinement. Refinements for samples C and D (not shown) were equally good.

Table 1 lists the refinement results for the a axis lattice constant for all the analyzed materials. Also shown is the apparent oxygen stoichiometry determined from the weight losses measured for samples C, D, and E after treatment. For this purpose, it was assumed that the oxygen stoichiometry of the starting material was precisely 12.00. (The amount of oxygen loss may be slightly overestimated in this way since some weight loss on heating may be attributed to the desorption of surface adsorbed moisture. However, in no way can such surface desorption of water influence the bulk lattice constant). The lattice constant is shown to increase as oxygen stoichiometry decreases. This increase is consistent with the creation of Mn$^{3+}$ which is a larger cation than Mn$^{4+}$.

TABLE 1

RIETVELD PROFILE REFINEMENT RESULTS AND OXYGEN STOICHIOMETRIES FOR SAMPLES OF INVENTIVE EXAMPLE 2

| | Li$_4$Mn$_5$O$_{12}$-400 | C | D | E |
|---|---|---|---|---|
| Lattice parameter, a in (Å) | 8.141 (1) | 8.150 (1) | 8.151 (1) | 8.187 (1) |
| Oxygen stoichiometry from weight loss | 12.00 (assumed) | 11.67 (3) | 11.55 (3) | 11.25 (3) |

Two laboratory coin cells were constructed and cycled using cathodes from each bulk batch of Li$_4$Mn$_5$O$_{12}$-400, sample C, D, and E respectively. All cells were charged to 4.2 V and the currents used corresponded to 3.0 mA/gram of active cathode material.

Figure 14:
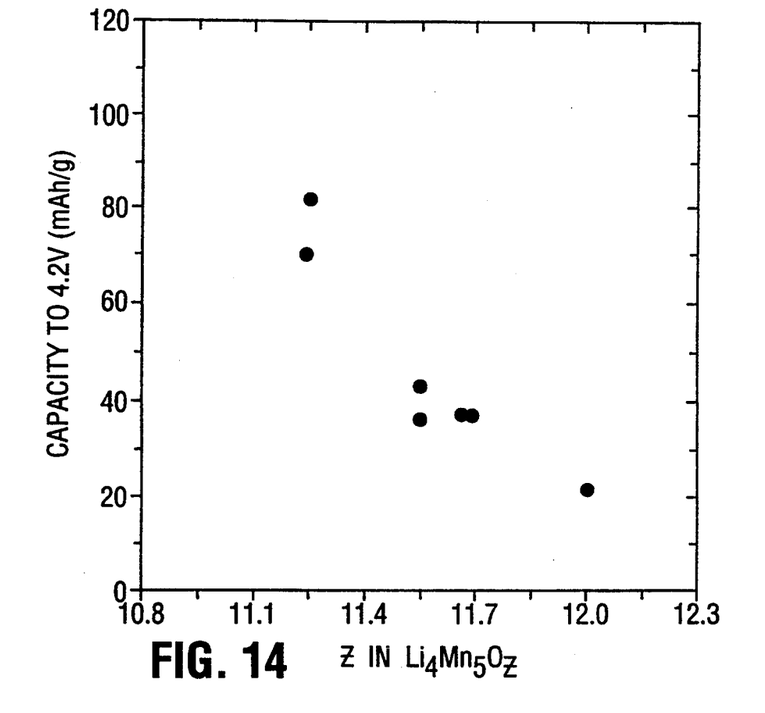
FIG. 14 shows the plot of the charge capacity for each coin cell battery of Inventive Example 2 versus the inferred oxygen stoichiometry derived in Table 1.

The charge capacity for each coin cell battery was measured and is plotted in FIG. 14 versus the inferred oxygen stoichiometry derived in Table 1. Samples C, D, and E prepared using the method of the invention have significantly greater charge capacity to 4.2 V than the Li$_4$Mn$_5$O$_{12}$-400 starting material.

Figure 15:
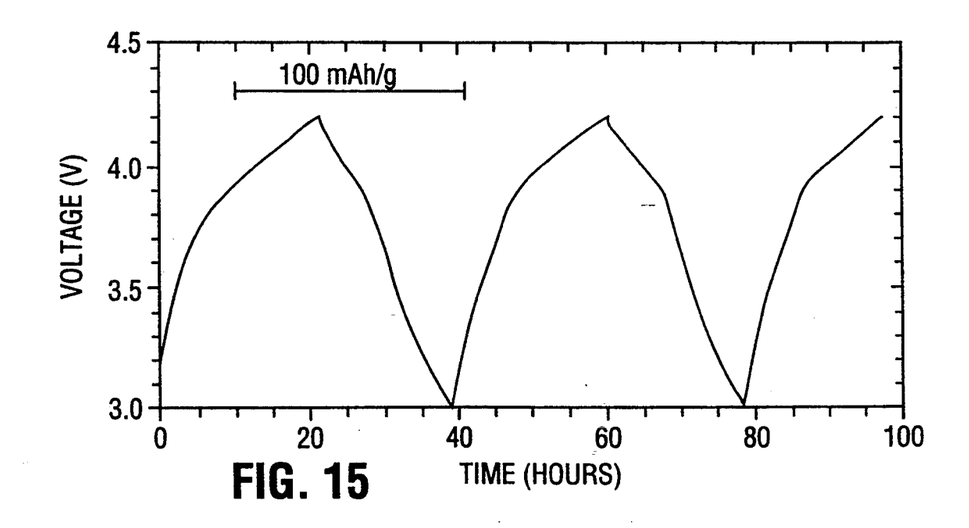
FIG. 15 shows the voltage versus time curve for the initial portion of a cycle test for one of the coin cell batteries of Inventive Example 2.

Coin cell batteries were then further cycle tested at 30° C. FIG. 15 shows the voltage versus time curve for the initial portion of this cycle test for one of the cells with cathode made from sample E. The increased capacity achieved via the method of the invention is clearly reversible. Similar results (not shown) were obtained for the other cycle tested materials.

This example demonstrates that the reversible capacity of Li$_4$Mn$_5$O$_{12}$-400 can be significantly increased using the method of the invention.

INVENTIVE EXAMPLE 3

A Li-Mn-O compound similar to LT-LiMnO$_2$ was prepared by reacting LiOH.H$_2$O (FMC Corp) and γ-MnOOH (Chemetals). In this case, a 10% atomic excess of Li was included (ie. the Li:Mn ratio in the mixture was 1.1:1). The powders were thoroughly mixed and then pressed into a pellet at 100 bar pressure. Next, the pellet was wrapped in Ni foil and heated to 350° C. in argon for 18 hours as described in more detail in Canadian Patent Application No. 2,096,264. Hereinafter this material will be denoted LT-LiMnO$_2$-350.

Figure 16:
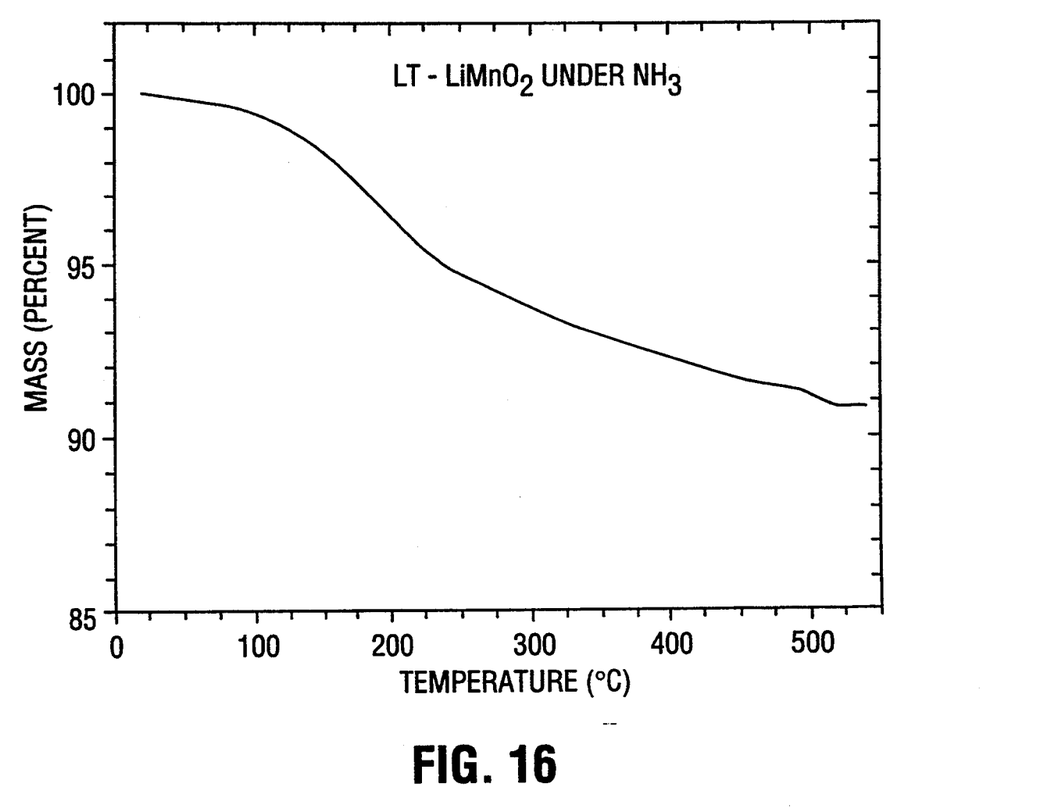
FIG. 16 shows the TGA weight loss versus temperature curve for the material of Inventive Example 3.

A TGA test was performed on this sample under pure ammonia at a heating rate of 1° C./minute. FIG. 16 shows the relative weight versus temperature curve for this test. The gradual weight loss seen below 200° C. again suggests that oxygen can be removed from this material, perhaps without altering the phase of the material.

While not wishing to be adversely bound by theory, the inventors offer the following explanation based on valence arguments as a possible reason for the observed capacity enhancement of the method of the invention. Cathode materials prepared at low temperatures generally have excess oxygen. The aforementioned reference of Thackeray et al shows that materials with a molar ratio of Li:Mn equal to 1:2 give a LiMn$_2$O$_{4.5}$ product when prepared at 400° C. When heated further, this material loses some oxygen to become close to LiMn$_2$O$_4$. The oxidation state of Mn in LiMn$_2$O$_{4.5}$ is +4, while in stoichiometric LiMn$_2$O$_4$ it is +3.5. Feng et al, Langmuir 8, 1861 (1992) show that the oxidation state of Mn in LiMn$_2$O$_4$ prepared at 400° C. is +3.7, while in LiMn$_2$O$_4$ prepared at 800° C. it is +3.6. This also shows that oxygen loss on heating must occur. As Li is extracted from Li-Mn-O compounds (such as by the charging of a battery employing a Li-Mn-O cathode), the average Mn oxidation state rises. If the Mn oxidation state is already large (e.g. +4), it is more difficult to remove lithium from the compound than it is when the Mn oxidation state is lower (eg +3.5). Therefore it seems preferable to lower the average Mn oxidation states in materials, wherever possible, in order to ease Li removal and hence increase the available lithium capacity of the cathode compound. Additionally, it seemed that the greatest benefits would most likely be achievable in materials prepared at low temperature (ie. below about 500° C.) as these often have excess oxygen. These same arguments are expected to apply to other Li-M-O compounds where M is any transition metal.

As will be apparent to those skilled in the art in the light of the foregoing disclosure, many alterations and modifications are possible in the practice of this invention without departing from the spirit or scope thereof. As an example, additional capacity enhancing treatment steps may be included in the overall cathode preparation. Thus, for instance, a conventional starting material may be synthesized, then further lithiated via other means known to those in the art in combination with the method of the invention. (One representation is $Li_xM_yO_z \rightarrow Li_{x'}M_yO_{z'} \rightarrow Li_{x'}M_yO_z$ wherein $x' > x$.) Accordingly, the scope of the invention is to be construed in accordance with the substance defined by the following claims.

What is claimed is:

1. A method of increasing the reversible capacity of lithium transition metal oxide cathodes of non-aqueous lithium batteries which comprises reducing lithium transition metal oxide materials of the form $Li_xM_yO_{z'}$, wherein M is one or more transition metals and x, y and z' are numbers greater than zero, with a reducing agent so that oxygen is removed from the material while maintaining the material in its original phase.

2. A method of producing a material for use as a cathode in a non-aqueous lithium battery comprising: treating a lithium transition metal oxide material of the formula $Li_xM_yO_{z'}$, wherein M is one or more transition metals and x, y and z' are numbers greater than zero, with a reducing agent to remove oxygen from the material without causing a phase change in the material.

3. A method as in claim 2 wherein M is Mn.

4. A method as in claim 2 wherein the reducing agent is a gas selected from the group consisting of $NH_3$, $H_2$, CO, and a suitable organic reducing gas.

5. A method as in claim 2 wherein the method is conducted at a temperature below about 300° C.

6. A method for preparing a cathode material in a phase with a final surface area and a formula $Li_xM_yO_z$ wherein M is one or more transition metals and x, y and z are numbers greater than zero comprising:
   a) selecting a starting material in said phase with a starting surface area and a formula $Li_xM_7O_{z'}$ wherein z' is a number greater than z; and
   b) treating said starting material in a reducing environment wherein oxygen is removed and wherein the reversible capacity of said cathode material is greater than that of said starting material.

7. A method as in claim 6 wherein M is Mn.

8. A method as in claim 6 wherein the starting material is synthesized at temperatures below about 500° C.

9. A method as in claim 6 wherein the final surface area and starting surface area are about the same.

10. A method as in claim 6 wherein the treatment comprises heating said starting material in a reducing gas mixture comprising a gas selected from the group of $NH_3$, $H_2$, CO, and organic gases.

11. A method as in claim 10 wherein the heating is performed at temperatures below about 300° C.

12. A method for preparing a cathode material in a phase with a final surface area and a formula $Li_xMn_yO_z$ wherein x, y and z are numbers greater than zero comprising:
   a) synthesizing, at temperatures below about 500° C., a starting material in said phase with a starting surface area and a formula $Li_xMn_yO_{z'}$ wherein z' is a number greater than z; and
   b) heating said starting material in a reducing gas mixture wherein oxygen is removed and wherein the reversible capacity of said cathode material is greater than that of said starting material.

13. A method as in claim 12 wherein the phase is that of spinel $LiMn_2O_4$.

14. A method as in claim 13 wherein x is about 1, y is about 2, z is about 4, and z' is less than or equal to about 4.5.

15. A method as in claim 13 wherein the heating is performed at temperatures below about 250° C. in a gas mixture comprising $NH_3$.

16. A method as in claim 15 wherein the heating is performed for a period up to about two hours.

17. A method as in claim 12 wherein the phase is that of $Li_4Mn_5O_{12}$.

18. A method as in claim 17 wherein x is about 4, y is about 5, and z is about 12.

19. A method as in claim 17 wherein the heating is performed at temperatures below about 225° C. in a gas mixture comprising $NH_3$.

20. A method as in claim 19 wherein the heating is performed for a period up to about 2 hours.

21. A method as in claim 12 wherein the phase is that of $LT-LiMnO_2$.

22. A method as in claim 21 wherein x is about 1, y is about 1, and z is about 2.

23. A method as in claim 21 wherein the heating is performed at temperatures below about 225° C. in a gas mixture comprising $NH_3$.

24. A method as in claim 23 wherein the heating is performed for a period up to about 2 hours.

25. A method for increasing the reversible capacity of a first cathode material in a phase with a first surface area and formula $Li_xM_yO_{z'}$, wherein M is one or more transition metals and x, y and z' are numbers greater than zero, comprising treating the cathode material in a reducing environment to form a second cathode material in said phase with a second surface area and a formula $Li_xM_yO_z$ wherein $0 < z < z'$.

26. A method as in claim 25 herein M is Mn.

27. A method as in claim 25 wherein the starting material is synthesized at temperatures below about 500° C.

28. A method as in claim 25 wherein the final surface area and starting surface area are about the same.

29. A method as in claim 25 wherein the treatment comprises heating said starting material in a reducing gas mixture comprising a gas selected from the group of $NH_3$, $H_2$, CO, and organic gases.

30. A method as in claim 29 wherein the heating is performed at temperatures below about 300° C.

31. A method as in claim 25 wherein the phase is that of spinel $LiMn_2O_4$.

32. A method as in claim 31 wherein x is about 1, y is about 2, z is about 4, and z' is less than or equal to about 4.5.

33. A method as in claim 31 wherein the heating is performed at temperatures below about 250° C. in a gas mixture comprising $NH_3$.

34. A method as in claim 33 wherein the heating is performed for a period up to about two hours.

35. A method as in claim 25 wherein the phase is that of $Li_4Mn_5O_{12}$.

36. A method as in claim 35 wherein x is about 4, y is about 5, and z is about 12.

37. A method as in claim 35 wherein the heating is performed at temperatures below about 225° C. in a gas mixture comprising $NH_3$.

38. A method as in claim 37 wherein the heating is performed for a period up to about 2 hours.

39. A method as in claim 25 wherein the phase is that of $LT-LiMnO_2$.

40. A method as in claim 39 wherein x is about 1, y is about 1, and z is about 2.

41. A method as in claim 39 wherein the heating is performed at temperatures below about 225° C. in a gas mixture comprising $NH_3$.

42. A method as in claim 41 wherein the heating is performed for a period up to about 2 hours.

43. A non-aqueous battery comprising:
a) an anode;
b) an electrolyte; and
c) a cathode comprising material prepared using the method of claim 1, 2, 6, 12 or 25.

44. A non-aqueous battery comprising:
a) an anode of lithium, a lithium alloy, a carbonaceous compound or a lithium insertion compound;
b) an electrolyte; and
c) a cathode comprising material prepared using the method of claim 1, 2, 6, 12 or 25.

45. A non-aqueous battery comprising:
a) an anode of lithium, a lithium alloy, a carbonaceous compound or a lithium insertion compound;
b) an electrolyte comprising a lithium salt dissolved in a mixture of non-aqueous solvents; and
c) a cathode comprising material prepared using the method of claim 1, 2, 6, 12 or 25.

46. A non-aqueous battery comprising:
a) an anode of lithium, a lithium alloy, a carbonaceous compound or a lithium insertion compound;
b) an electrolyte comprising $LiPF_6$ dissolved in a mixture of dimethyl carbonate, ethylene carbonate, and propylene carbonate solvents; and
c) a cathode comprising material prepared using the method of claim 1, 2, 6, 12 or 25.

* * * * *

UNITED STATES PATENT AND TRADEMARK OFFICE
CERTIFICATE OF CORRECTION

PATENT NO. : 5,449,577
DATED : September 12, 1995
INVENTOR(S) : Dahn et al.

It is certified that error appears in the above-identified patent and that said Letters Patent is hereby corrected as shown below:

Column 2, line 13, "$Li_4Mn_2O_4$" should read --$Li_4Mn_5O_{12}$--.

Signed and Sealed this

Twenty-sixth Day of December, 1995

Attest:

BRUCE LEHMAN

Attesting Officer

Commissioner of Patents and Trademarks